United States Patent [19]

Yang et al.

[11] Patent Number: 5,761,362
[45] Date of Patent: *Jun. 2, 1998

[54] POLYPROPYLENE-POLYETHYLENE COPOLYMER BUFFER TUBES FOR OPTICAL FIBER CABLES AND METHOD FOR MAKING THE SAME

[75] Inventors: Hou-Ching M. Yang, Fourqueux, France; James D. Holder; Christopher W. McNutt, both of Hickory, N.C.

[73] Assignee: Alcatel NA Cable Systems, Inc., Claremont, N.C.

[*] Notice: The term of this patent shall not extend beyond the expiration date of Pat. No. 5,574,816.

[21] Appl. No.: 716,445

[22] PCT Filed: Jan. 24, 1996

[86] PCT No.: PCT/US96/00974
§ 371 Date: Sep. 19, 1996
§ 102(e) Date: Sep. 19, 1996

[87] PCT Pub. No.: WO96/23239
PCT Pub. Date: Aug. 1, 1996

Related U.S. Application Data

[63] Continuation-in-part of Ser. No. 377,366, Jan. 24, 1995, Pat. No. 5,574,816.

[51] Int. Cl.$^6$ .................................................. G02B 6/44
[52] U.S. Cl. ........................ 385/109; 385/113; 385/141
[58] Field of Search .................................. 385/100, 102, 385/103, 104, 109, 111, 113, 141; 428/364

[56] References Cited

U.S. PATENT DOCUMENTS

| | | | |
|---|---|---|---|
| 3,517,086 | 6/1970 | Shirayama et al. | 260/897 |
| 3,937,559 | 2/1976 | Ferrentino et al. | 350/96 |
| 4,185,887 | 1/1980 | Ferrentino | 350/96.23 |
| 4,289,375 | 9/1981 | Andersen et al. | 385/100 |
| 4,392,014 | 7/1983 | Trumble et al. | 174/92 |
| 4,468,435 | 8/1984 | Shimba et al. | 428/383 |

(List continued on next page.)

FOREIGN PATENT DOCUMENTS

| | | | |
|---|---|---|---|
| 0469383 | 2/1992 | European Pat. Off. | G02B 6/44 |
| 4020800 | 1/1992 | Germany | G02B 6/44 |

OTHER PUBLICATIONS

Plastic Additives Handbook, 3rd Edition by R. Gächter and H. Müller, Associated Editor, P.P. Klemchuk, pp. 525, 527 & 870–873, 1990 [No Month].

*Primary Examiner*—John D. Lee
*Attorney, Agent, or Firm*—Ware, Fressola, Van Der Sluys & Adolphson LLP

[57] ABSTRACT

A buffer tube for an optical fiber cable is made from a polypropylene-polyethylene copolymer resin having nucleating agents and filler materials disbursed therein. The nucleating agents and filler materials improve compression-tension resistance and thermal expansion properties of the polypropylene-polyethylene copolymer buffer tube (32). A non-armored cable structure incoporates the present invention and is generally indicated by the numeral (30). This structure includes a single, large, gel-filled buffer tube (32) made of a polypropylene-polyethylene copolymer at least incorperating a nucleating agent. The gel in the buffer tube is a thioxotropic, water-blockable gel. The gel-filled buffer tube (32) contains a plurality of optical fibers (34). Radial strength yarns (36), made from either aramid, polyethylene, polyester, or fiberglass materials, are contra-helically stranded around the buffer tube (32) and impregnated with filling compounds such as a petroleum based hot melt filling compound. Two metallic or dielectric strength members (38) are located 180 degrees apart on the outside of the radial strength yarns (36). A high strength rip cord (40) is applied over the radial strength yarns (36) to aid in sheath removal. A medium-density polyethylene (MDPE) outer jacket (42) encapsulates the strength members (38) and radial strength yarns (36) to complete the structure. The MDPE of jacket (42) may be filled with carbon black powder.

19 Claims, 4 Drawing Sheets

U.S. PATENT DOCUMENTS

| | | | |
|---|---|---|---|
| 4,585,817 | 4/1986 | Su et al. | 524/108 |
| 4,643,865 | 2/1987 | Okada et al. | 264/280 X |
| 4,894,281 | 1/1990 | Yagi et al. | 428/364 X |
| 5,031,996 | 7/1991 | Saller et al. | 350/96.23 |
| 5,138,683 | 8/1992 | Oestreich et al. | 385/109 |
| 5,358,011 | 10/1994 | Stockton et al. | 138/103 |
| 5,561,729 | 10/1996 | Parris | 385/113 |
| 5,574,816 | 11/1996 | Yang et al. | 385/109 | ic # POLYPROPYLENE-POLYETHYLENE COPOLYMER BUFFER TUBES FOR OPTICAL FIBER CABLES AND METHOD FOR MAKING THE SAME

This application is a continuation-in-part of U.S. Ser. No. 08/377,366, filed on Jan. 24, 1995 entitled "Polypropylene-polyethylene Copolymer Buffer Tubes for Optical Fiber Cables and Method for Making the Same," assigned to the assignee hereof now U.S. Pat. No 5,574,816. The disclosure of the above referenced parent application is hereby incorporated by reference.

BACKGROUND OF THE INVENTION

1. Field of the Invention

The present invention relates to optical fiber cables and, more particularly, to a polypropylene-polyethylene copolymer core or buffer tube for an optical fiber cable, and a method for making the same.

2. Description of the Prior Art

Optical fiber cables have been used for many years to transmit information at high rates and very long distances. The transmission medium of the optical fiber cable are delicate hair-thin optical fibers. Ordinarily, these optical fibers reside in a buffer tube or in a core tube. Hereinafter, for the sake of simplicity, buffer tubes shall also include core tubes. The buffer tube provides the primary structure to protect the hair-thin optical fibers residing therein. The buffer tube may be fabricated from a single material or from a combination of two or more materials in a multi-layer form.

In virtually all optical fiber cables, it is desirable to have a buffer tube made from a material with a high Young's modulus. The use of a material with a high Young's modulus results in a cable with a buffer or core tube having relatively high tensile and compressive resistance capability, a trait useful in protecting the optical fibers in the event the cable is twisted, stretched or compressed. Also, it is important to select a material for the buffer tube that has a low thermal expansion coefficient. Too much shrinkage or expansion of the buffer tube caused by temperature changes could place tensile or compressive loads on the optical fibers residing therein. High tensile or compressive loads can result in damaged or broken optical fibers.

Prior art buffer tubes have been made from polybutylene terephthalate (PBT), polycarbonate (PC), a layered combination of PBT and PC, or a polyamide such as Nylon-b 12.The PBT, PC or Nylon are fairly good materials for making buffer or core tubes because they are materials that have high Young's modulus and low thermal expansion coefficients. However, such materials also have some disadvantages when compared to other materials such as polypropylene-polyethylene copolymers. These disadvantages include higher cost, lower flexibility, moisture sensitivity, and increased difficulty in handling and processing due to the mechanical properties of the materials.

While polypropylene-polyethylene copolymers are cheaper and easier to handle than PBT, PC or Nylon and could be used as buffer or core tubes for optical fiber cables, they generally have not been favored over PBT, PC or Nylon. The polypropylene-polyethylene copolymers generally have higher thermal expansion coefficients and lower Young's modulus than PBT, PC or Nylon such that a buffer tube made with the polypropylene-polyethylene copolymer would have greater shrinkage, and less compression-tension resistance. The disadvantages of greater shrinkage and lower compression-tension resistance of polypropylene-polyethylene copolymers have outweighed the material handling and cost advantages offered by this material.

To overcome some of the above noted disadvantages, U.S. Pat. No. 5,031,996 discloses an optical fiber cable having a dual-layer buffer tube. According to this patent the outside layer is formed from PBT and the inside layer from a modified polypropylene material. The patent further discloses that the modified polypropylene material may be a copolymer with polyethylene which is provided with an inorganic filler as a blend with cross-linked polypropylene to enhance its properties.

One disadvantage with the modified polypropylene material disclosed in U.S. Pat. No. 5,031,996 is that relatively large amounts of filler must be added to the polypropylene polymer to obtain the appropriate mechanical strengths required for optical fiber cables. When large amounts of filler are added, the buffer tube becomes too stiff and loses its flexibility at low temperatures. Also, the processibility of polymer with high filler content or loading (typically 20 to 40 percent by weight) becomes more difficult and causes extruder tooling abrasion. Furthermore, modification of the polypropylene polymer with inorganic filler materials does not increase the crystallization rate, which is important because high crystallization rates lead to improvements in the stability of the buffer tube and lowers excess fiber length requirements.

SUMMARY OF THE INVENTION

The present invention is designed to overcome the limitations that are attendant upon the use of the prior art cables and materials described above, and toward this end, it contemplates a polypropylene-polyethylene copolymer optical fiber cable buffer tube which has high strength, low shrinkage, good flexibility, improved processibility and low cost. In the preferred embodiment, the buffer tube can be made by extruding a tube from a polypropylene-polyethylene copolymer having a nucleating agent incorporated therein. Examples of nucleating agents include inorganic materials, salts of aliphatic monobasic or dibasic acids, aralkyl acids, or alkali metal or aluminum salts of aromatic or alicyclic carboxylic acids.

Also, materials such as talc, glass fiber, glass spheres, for example, may also be added as filler materials to a nucleated polypropylene-polyethylene copolymer prior to extrusion of a buffer tube to further modify the physical properties such as strength, shrinkage, and flexibility of the resulting extruded tube.

It is an object of the present invention to provide a buffer tube manufactured from a polypropylene-polyethylene copolymer that has high strength, low shrinkage, good flexibility, improved processibility and low cost.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Single Layer Buffer Tubes

Figure 1:
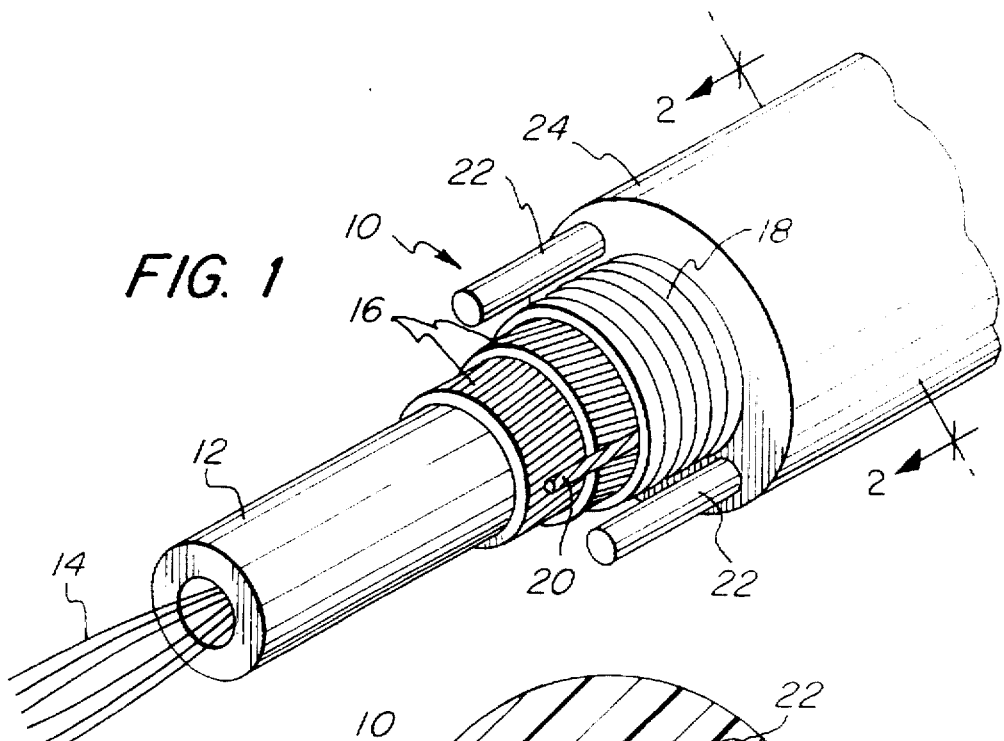
FIG. 1, which is a perspective cutaway section of an optical fiber cable made with the buffer tube of the present invention.

Referring to FIG. 1, therein is illustrated an optical fiber cable as generally indicated by the numeral 10 incorporating the present invention. This cable structure 10 has a single large, gel-filled buffer or core tube 12 made from a polypropylene-polyethylene copolymer resin or compound blended with at least a nucleating agent. The gel in the buffer tube is a thixotropic, water blockable gel such as mineral gels, petroleum gels. The gel filled buffer tube 12 contains a plurality of optical fibers 14. Radial strength yarns 16 made of either aramid, polyethylene, polyester or fiberglass materials are contra-helically stranded around the buffer tube 12 and impregnated with filling compound such as a petroleum based hot melt filling compound. Preferably, at least 50% of the outer surface area of the buffer tube 12 is covered by the radial strength yarns 16. Corrugated steel armor 18 is applied over the radial strength yarns 16 and the corrugated steel armor 18 is flooded with a water blockable flooding compound 19 such as petroleum based hot melt filling compound manufactured by Witco Corporation, New York, N.Y. or Amoco Chemical Company, Chicago, or a petroleum based flooding compound. A high strength rip cord 20 is applied under the armor 19 to aid with sheath removal. Two strength members 22 are located 180 degrees apart on the outside of the corrugated armor 18. The strength members 22 may be fabricated from steel or fiber reinforced plastics. A medium-density polyethylene (MDPE) outer jacket 24 encapsulates the strength members 22 and corrugated armor 18 to complete the structure. The water blockable flooding compound 19 is disposed between the corrugated armor 18 and the outer jacket 24.

Figure 2:
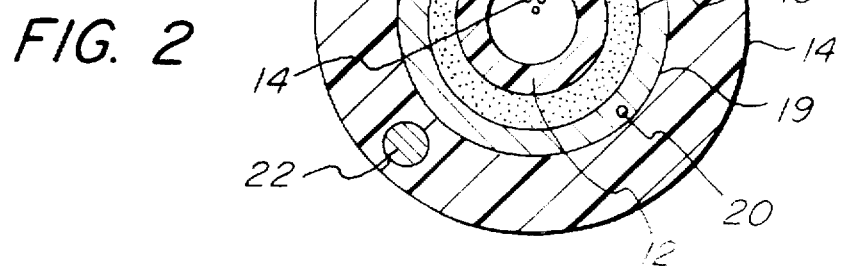
FIG. 2, which is a cross-sectional view taken along the 2—2 line of FIG. 1.
Figure 3:
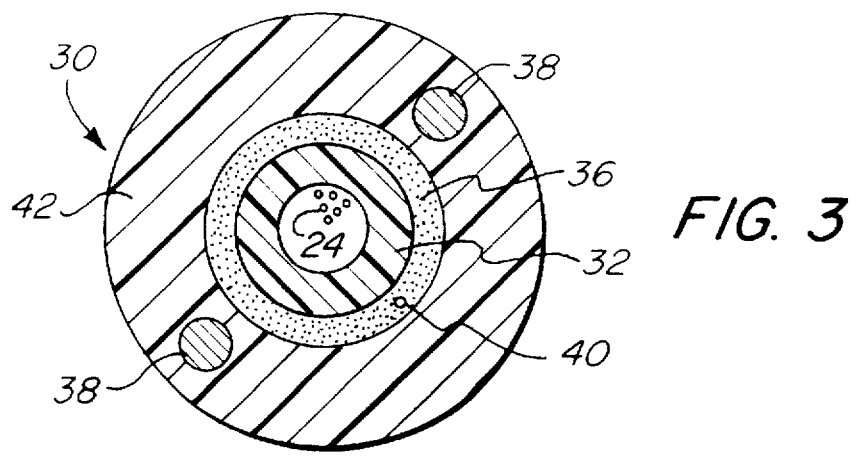
FIG. 3, which is a cross-sectional view similar to FIG. 2 but of another cable structure incorporating the buffer tube of the present invention.

FIG. 3 generally illustrates a non-armored cable structure incorporating the present invention and is generally indicated by the numeral 30. This structure includes a single, large, gel-filled buffer tube 32 made of a polypropylene-polyethylene copolymer at least incorporating a nucleating agent. Similar to the cable design shown in FIGS. 1 and 2, the gel in the buffer tube is a thixotropic, water-blockable gel. The gel-filled buffer tube 32 contains a plurality of optical fibers 34. Radial strength yarns 36, made from either aramid, polyethylene, polyester, or fiberglass materials, are contra-helically stranded around the buffer tube 32 and impregnated with filling compounds such as a petroleum based hot melt filling compound manufactured by Witco or Amoco. Similar to the cable shown in FIGS. 1 and 2 at least 50% of the outer surface area of the buffer tube 32 is covered by the radial strength yarns 36. Two metallic or dielectric strength members 38 are located 180 degrees apart on the outside of the radial strength yarns 36. A high strength rip cord 40 is applied over the radial strength yarns 36 to aid in sheath removal. A medium-density polyethylene (MDPE) outer jacket 42 encapsulates the strength members 38 and radial strength yarns 36 to complete the structure. The MDPE of jacket 42 may be filled with carbon black powder.

The two embodiments discussed above merely provide examples of optical fiber cable structures with single layer buffer tubes for which the present invention may be used. It will be appreciated by those skilled in the art that the present invention may be used with other fiber optic cable structures, such as a dual layer buffer tube as described below.

According to the present invention, less expensive polypropylene-polyethylene copolymer resins or other compounds can be used to make buffer tubes for optical fiber cable structures, such as those shown in FIGS. 1–3, by incorporating nucleating agents in the polypropylene-polyethylene copolymer melt prior to extrusion of a buffer tube, and additionally, by incorporating filler materials with the nucleated copolymer during the extrusion of a buffer tube. Nucleating agents that can be used in the present invention include: inorganic materials such as talc, mica, silica, carbon black and kaolin; salts of aliphatic monobasic or dibasic acids or arylalkyl acids such as sodium succinate, sodium glutarate, sodium caproate, sodium 4-methylvalerate, aluminum phenylacetate and sodium cinnamate; or alkali metal or aluminum salts of aromatic or alicyclic carboxylic acids, such as aluminum benzoate, sodium or potassium benzoate, sodium β-naphthoate, lithium benzoate, and aluminum term.-butylbenzoate.

The nucleating agents form nuclei for growth of crystals in the polypropylene-polyethylene copolymer melt. A high degree of crystallinity and a more uniform crystalline structure is obtained by adding the nucleating agent to the copolymer melt. As a result of increasing the degree of crystallinity of the copolymer, the resulting copolymer has increased Young's modulus, yield, tensile strength, compression resistance and dimensional stability as well as a reduced coefficient of thermal expansion.

Any nucleating agent added to the polypropylene-polyethylene melt to improve the above mentioned physical properties should be homogeneously dispersed in the polymer melt in a fine form (approximately 1 to 10 μm in size). It has been found that concentrations up to 0.5 weight percent provide the maximum enhancements of the copolymer's physical properties. It has also been found that higher concentrations of nucleating agents do not necessarily produce further enhancements of the copolymer's physical properties, and likewise, a buffer tube made therefrom.

As discussed above, in addition to nucleating agents, filler materials can be added to a copolymer prior to the extrusion process used in making a buffer tube. Filler materials found useful for improving the Young's modulus, yield, tensile strength, compression resistance and dimensional stability of the copolymer as well as reduce the coefficient of thermal expansion include: talc, glass fiber, glass spheres, sodium benzoate or calcium carbonate in the copolymer prior to the extrusion of a buffer tube.

Thus, according to the present invention, a single layer polypropylene-polyethylene copolymer buffer tubes suitable for use in optical fiber cables can be fabricated by extruding, using any well known extrusion process, a polypropylene-polyethylene copolymer resin having approximately 2 to 30 weight percent polyethylene containing approximately 0.1 to 1.0 weight percent nucleating agent therein, such as talc. In another embodiment, a polypropylene-polyethylene copolymer buffer tube may be fabricated by extruding a blend of a polypropylene-polyethylene copolymer resin containing approximately 0.1 to 1.0 weight percent nucleating agent therein and polypropylene-polyethylene copolymer compound having approximately 1 to 40 weight percent filler material disbursed therein.

For example, it has been found that buffer tubes of the present invention can be produced from Stamylan 83E10N polypropylene resin supplied by DSM Engineering Plastics of Geleen, The Netherlands. This resin has approximately 0.4 weight % talc nucleating agent and approximately 11 wt % polyethylene. This resin can be extruded with a Maileffer 45 mm single screw extruder, a Nokia-Maileffer model 4/6 crosshead using a screen pack of 20/40/80 mesh, and a screw having double flights in its feed section, double barriers in its metering section, a length to diameter ratio of 20 to 1 and a compression ratio up to 2 to 1. The buffer tubes of the present invention may be made by extrusion with the above described apparatus according to the processing and tooling parameters set forth in Table 1.

TABLE 1

| Line Speed | 30.1 meters/min |
| --- | --- |
| Die/Trough Distance | 7.5" |
| Melt Temp. | 419° F. |
| Screw Speed | 22.0 rpm |
| Gel Output | 34.0 rpm |
| Gel Temp. | 123° F. |
| 1st Trough Temp. | 48.2° F. |
| 2nd Trough Temp. | 64.0° F. |
| Tube Outside Diameter (OD) | 0.120" |
| Tube Inside Diameter (ID) | 0.081" |
| Tube Wall Thickness | 0.020" |
| Die ID | 0.270" |
| Tip OD | 0.180" |
| Tip ID | 0.140" |
| Gel Needle (OD × ID) | 0.100" × 0.120" |
| Hot Water Temp. | Ice water |
| Cold Water Temp. | Ice water |
| Resin Drying Temp. | 130° F. for more than 4 hours |
| Extruder Temp. Profile | 185/195/200/212/240/240° C. |

Of course, it will be appreciated by those skilled in the art that variations on the above mentioned starting materials, tooling and processing parameters can be made without deviating from the spirit and scope of the present invention.

Generally, the compression resistance of buffer tubes made according the present invention can be determined using the procedures set forth in ASTM D695-90. A further discussion of compression resistance testing may also be found in an article by P. E. Neveux and W. H. Hatton entitled "Designing Compression Resistance in Loose Tube Cables" published in the International Wire and Cable Symposium Proceedings, 1987, pages 656 through 661.

Figure 4:
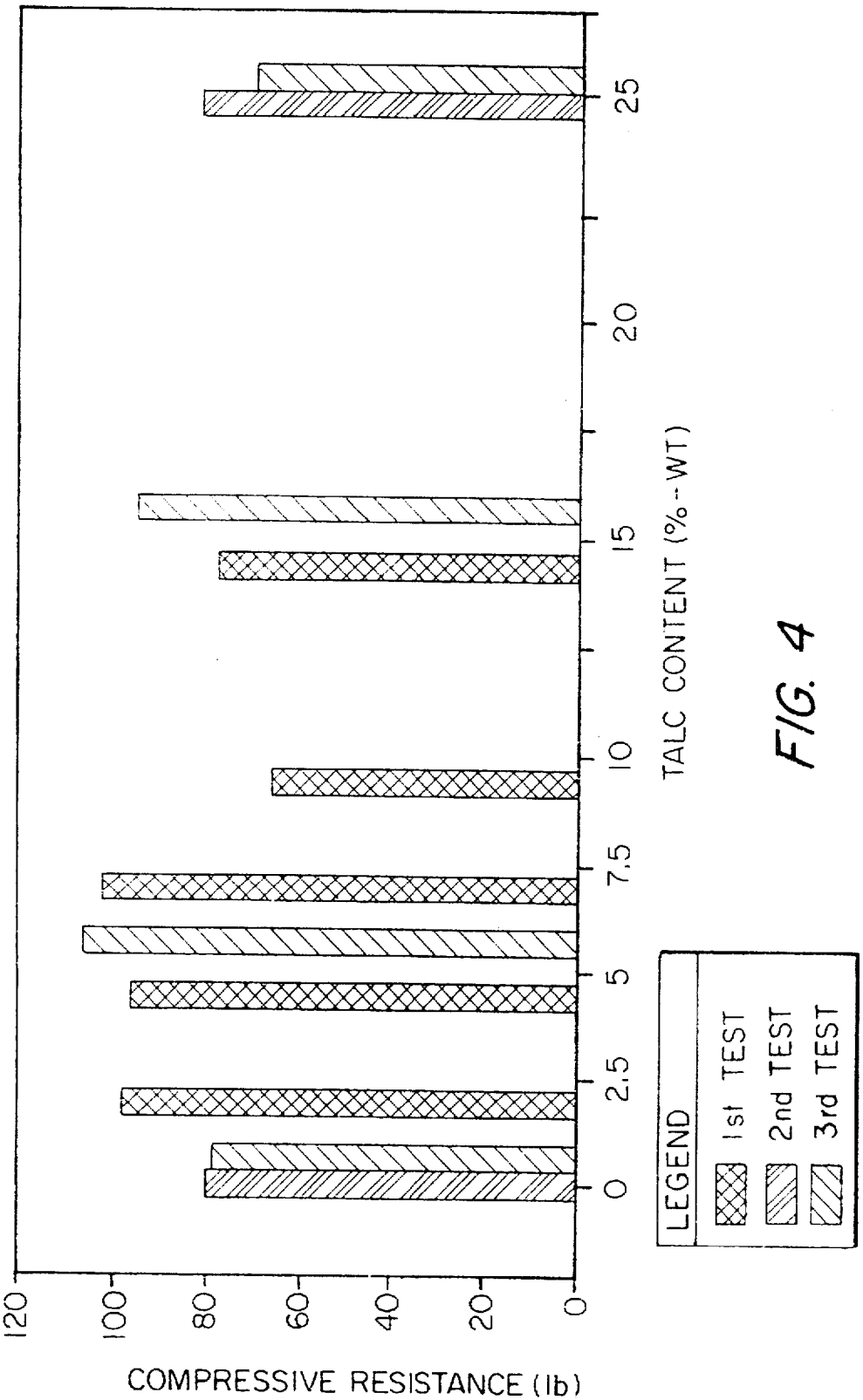
FIG. 4, which is a compression resistance chart comparing compression resistance to talc content for buffer tubes made according to the present invention.

FIG. 4 illustrates a comparison of the compression resistance of four inch samples of several buffer tubes of varying weight percent of the filler material talc, made according to the present invention. The samples shown in FIG. 4 were tested with an Instron series IX Automated Materials Testing System. Cross head speeds of approximately 0.05 inches per minute were used to test the buffer tubes, however, cross head speeds between the ranges of 0.01 to 1 inch per minute can be used to test the compression resistance of a tube sample. As will be appreciated by those skilled in the art after reviewing FIG. 4, the compression resistance of polypropylene-polyethylene copolymer buffer tubes can be increased by up to 320 psi (i.e., from 1030 to 1350 psi) by following the method of the present invention.

Figure 5:
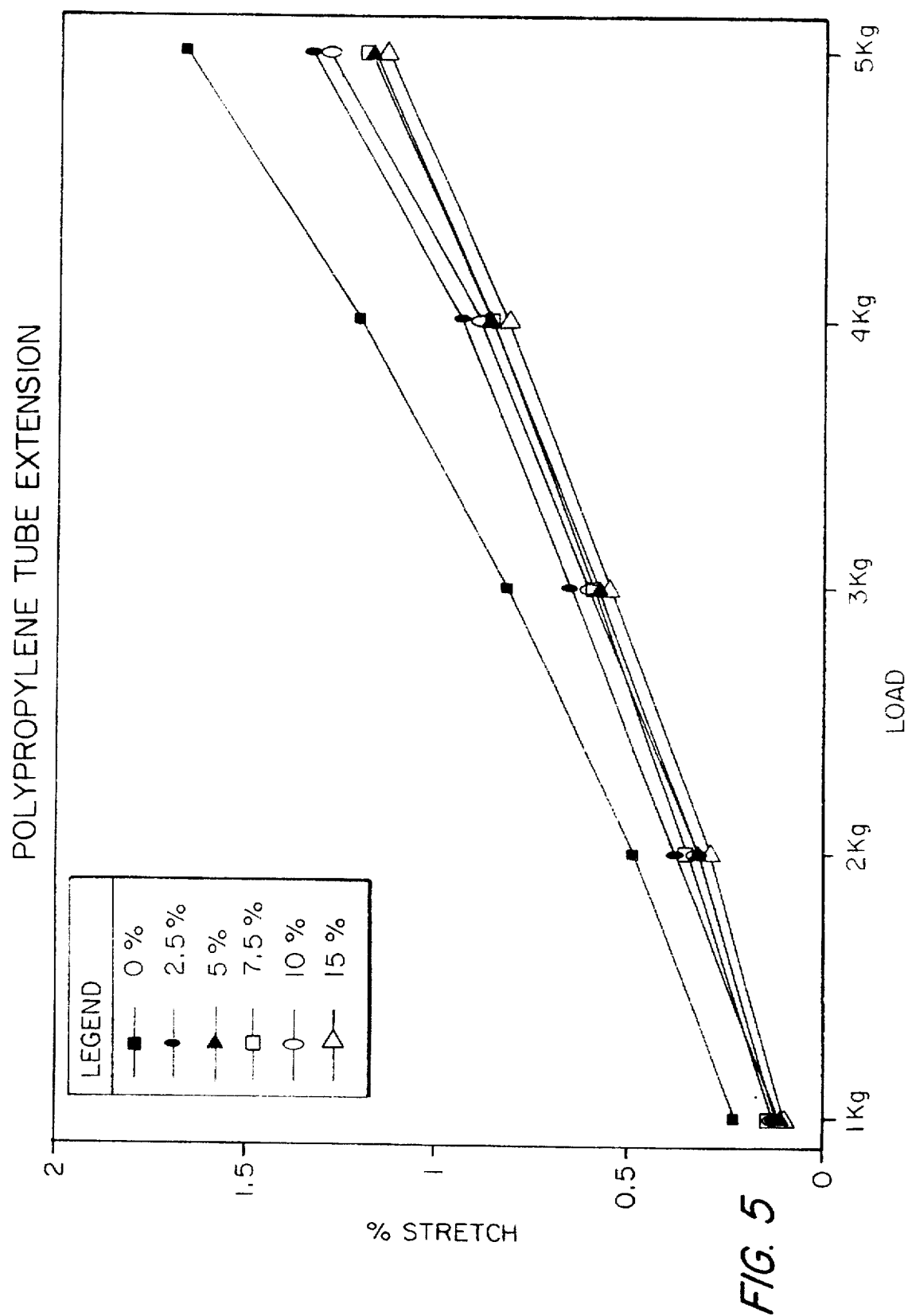
FIG. 5, which is a graph comparing stretch to load for various buffer tubes of differing talc content made according to the present invention.

FIG. 5 is a graphic illustration of tube extension resistance test results. Tube extension resistance test is a comparison of tube stretch (in percentage) to load applied (in kilograms). FIG. 5 shows the results for several buffer tubes having varying weight percentages of filler materials made according to the present invention. The test was conducted by applying a tensile load of 1 to 5 kilograms to a tube of 1 to 10 feet in length for a period of 1 to 60 minutes. As apparent from FIG. 5, polypropylene-polyethylene buffer tubes containing as little as 2.5 weight percent talc as a filler material were more resistant to stretching than a polypropylene-polyethylene buffer tube with no filler material at all. It has been found that tube extension resistance can be improved by up to 100% by the incorporation of filler materials according to the method of the present invention.

Dual Layer Buffer Tubes

Figure 6:
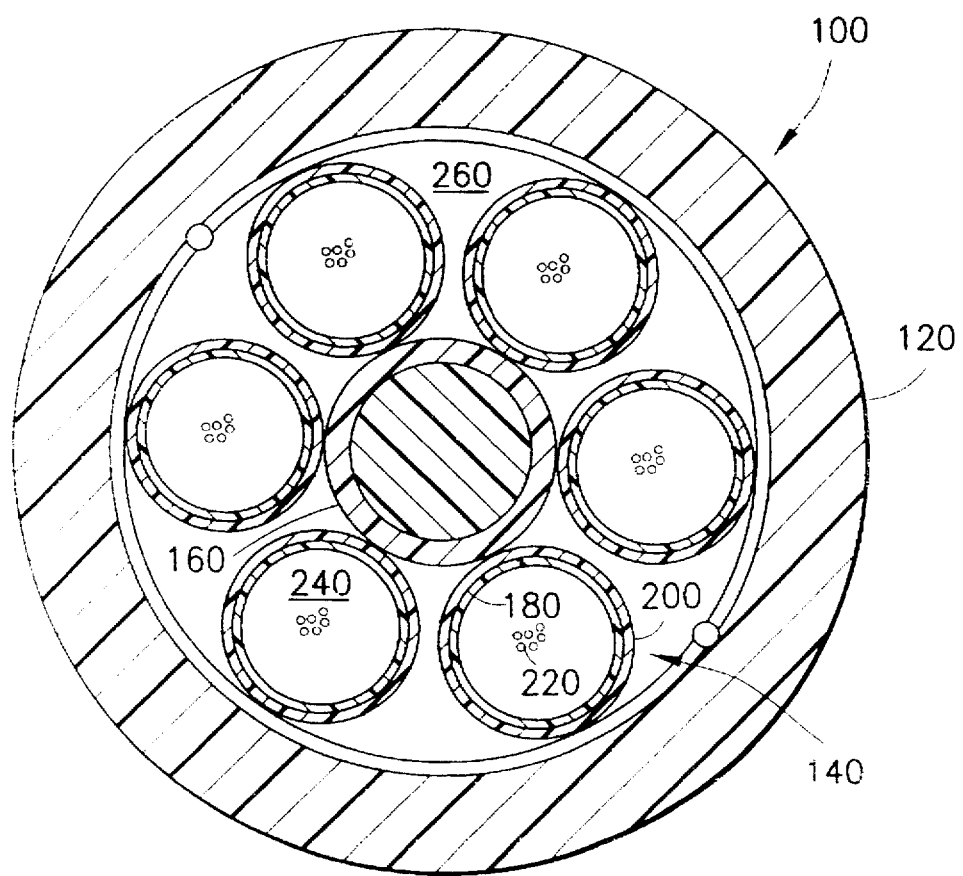
FIG. 6, which is a cross-sectional view of a conventional optical fiber cable having a plurality of dual-layer buffer tubes made according to the present invention.

The present invention can also be applied to multi-layer buffer tube for optical fiber cable. Referring to FIG. 6, there is illustrated a cross-section of a typical dual-layer optical fiber cable 100. The cable 100 has an outer jacket 120 that houses a plurality of dual-layer buffer tubes 140 arranged about a central strength member 160. The dual-layer buffer tubes 140 have an inside layer or sheath 180 and an outside layer or sheath 200. Optical fibers 220 reside within the space 240 inside layer 180. A soft filling compound (not shown) may also reside within the inside layer 180 and a filling compound may also reside in the space 260 between the outside layer 200 of the buffer tubes 140 and the outer jacket 120.

Prior art cables have used various materials, such as aramides, polyesters, polyolefins or polycarbonates, for the inside 180 and outside 200 layers 180 of the buffer tube 140. It is contemplated by the present invention that any materials known to be useful in the fabrication of a layer of multi-layer buffer tubes may be used as a layer in combination with a layer made according to the present invention.

At least one of the layers of the multi-layer buffer tube is fabricated by co-extrusion of a copolymer of polypropylene-polyethylene having a nucleating agent distributed therein. The amount of nucleating agent is preferably in the range of approximately 0.05 to 2.0 weight percent. The nucleating agent enables the extruded polypropylene-polyethylene copolymer buffer tube to crystalize at a substantially faster rate than a non-nucleated polyethylene-polypropylene copolymer buffer tube. The faster crystallization rate "locks in" the crystalline structure of the polypropylene-polyethylene, which in turn, makes the polyproylene-polyethylene layer of the multi-layer buffer tube shrinkage more stable.

One advantage provided by the present invention is that residual buffer tube shrinkage of a polypropylene-polyethylene copolymer buffer tube can be reduced and, accordingly, excess fiber length can be reduced. Excess fiber length is defined as the ratio difference between a unit buffer tube length and a unit optical fiber length residing within the unit buffer tube length. High excess fiber length can lead to fiber microbending problems that cause excessive attenuation.

According to the present invention, the nucleating agent added to the copolymer prior to extrusion may be an inorganic or organic material such as sodium or potassium benzoate, talc, polycarboxylic acids or certain pigments. Also, the present invention contemplates that some polymers, such as polyethylene, or some copolymers, such as ethylene/acrylic ester, can be used as nucleating agents.

Also, the nucleated polypropylene-polyethylene copolymer material can be mixed with filler material, such as talc, mica, glass fiber or metal oxides, to further enhance its strength and shrinkage properties. It is contemplated by the present invention that such filler materials may be added in the range of 0.05 to 20 weight percent, which has been found to be an acceptable range which balances the strength properties obtained by such filler materials with the increased difficulty in processibility caused by the filler materials.

Thus, it can be seen from the foregoing specification and attached drawings that the present invention provides an effective buffer tube for housing optical fiber transmission media and an effective method for making the same. The buffer tube and method of making it emphasize the positive features and minimize the negative features of the prior art. As compared to the prior art, the buffer tubes made according to the present invention provide a less expensive, easier to process, rugged housing for optical fibers. The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A multi-layer buffer tube (140) for use in an optical fiber cable, the buffer tube comprising at least one layer (200) fabricated from a polypropylene/polyethylene copolymer resin having a nucleating agent disbursed therein.

2. A multi-layer buffer tube (140) as described in claim 1, wherein the nucleating agent disbursed in the copolymer resin is an inorganic material selected from a group of inorganic materials consisting of talc, mica, silica, carbon black and kaolin.

3. A multi-layer buffer tube (140) as described in claim 1, wherein the nucleating agent disbursed in the copolymer resin is a salt of an aliphatic monobasic dibasic or arylalkyl acid selected from the group consisting of sodium succinate, sodium glutarate, sodium caproate, sodium 4-methylvalerate, aluminum phenylacetate and sodium cinnamate.

4. A multi-layer buffer tube (140) as described in claim 1, wherein the nucleating agent disbursed in the copolymer resin is an alkali metal or aluminum salt of aromatic or alicyclic carboxylic acids selected from the group consisting of aluminum benzoate, sodium or potassium benzoate, sodium β-naphthoate, lithium benzoate, and aluminum tert-butylbenzoate.

5. A multi-layer buffer tube (140) as described in claim 1, wherein the resin contains approximately 0.05 to 2.0 weight percent nucleating agent.

6. A multi-layer buffer tube (140) as described in claim 1, wherein the resin contains approximately 0.5 weight percent talc as the nucleating agent.

7. A multi-layer buffer tube (140) as described in claim 1, wherein the copolymer resin contains approximately 2 to 30 weight percent polyethylene.

8. A multi-layer buffer tube (140) as described in claim 7, wherein the copolymer resin contains approximately 0.05 to 20 weight percent nucleating agent.

9. A multi-layer buffer tube (140) as described in claim 1, wherein the nucleated copoylmer resin further includes a filler material disbursed therein.

10. A multi-layer buffer tube (140) as described in claim 9, wherein the filler material disbursed in the copolymer compound is selected from the group consisting of talc, mica, glass fiber, glass spheres, sodium benzoate and calcium carbonate.

11. A multi-layer buffer tube (140) as described in claim 9, wherein the filler material is in in the range of approximately 0.5 to 20 weight percent.

12. A multi-layer buffer tube (140) as described in claim 9, wherein the filler material is 1 to 5 weight percent talc.

13. An optical fiber cable (100) comprising:
   a multi-layer buffer tube (140) made having at least one layer (200) made from a polypropylene/polyethylene copolymer resin having a nucleating agent disbursed therein; and
   at least one optical fiber transmission medium (220) positioned in the multi-layer buffer tube (140).

14. An optical fiber cable (100) as described in claim 13, wherein the amount of nucleating agent dispersed in the copolymer resin is in the range of 0.05 to 2.0 weight percent.

15. An optical fiber cable (100) as described in claim 13, wherein the nucleating agent disbursed in the copolymer resin is an inorganic material selected from a group of inorganic materials consisting of talc, mica, silica, carbon black and kaolin.

16. An optical fiber cable (100) as described in claim 13, wherein the nucleating agent disbursed in the copolymer resin is an alkali metal or aluminum salt of aromatic or alicyclic carboxylic acids selected from the group consisting of aluminum benzoate, sodium or potassium benzoate, sodium β-naphthoate, lithium benzoate, and aluminum tert-butylbenzoate.

17. An optical fiber cable (100) as described in claim 13, wherein the nucleated copoylmer resin further includes a filler material disbursed therein.

18. An optical fiber cable (100) as described in claim 17, wherein the filler material is in in the range of approximately 0.5 to 20 weight percent.

19. An optical fiber cable (100) as described in claim 17, wherein the filler material is 1 to 5 weight percent talc.

* * * * *